United States Patent [19]

Murata et al.

[11] Patent Number: 5,230,391
[45] Date of Patent: Jul. 27, 1993

[54] WEIGHER-CONVEYOR SYSTEM

[75] Inventors: Hajime Murata; Shinsuke Sakamoto, both of Shiga, Japan

[73] Assignee: Ishida Scales Mfg. Co., Ltd., Shiga, Japan

[21] Appl. No.: 873,393

[22] Filed: Apr. 24, 1992

[30] Foreign Application Priority Data

May 16, 1991 [JP] Japan .................................. 3-141362

[51] Int. Cl.⁵ ...................... G01G 19/52; G01G 19/00
[52] U.S. Cl. ........................................ 177/50; 177/145
[58] Field of Search ............ 177/50, 145, 185, 210 FP

[56] References Cited

U.S. PATENT DOCUMENTS

| | | | |
|---|---|---|---|
| 4,392,535 | 7/1983 | Fujii et al. | 177/145 X |
| 4,771,836 | 9/1988 | Naito et al. | 177/145 X |
| 4,848,492 | 7/1989 | Hubbard et al. | 177/145 X |
| 5,046,570 | 9/1991 | Emme et al. | 177/145 |
| 5,109,936 | 5/1992 | Ruppel | 177/50 X |
| 5,178,227 | 1/1993 | Kvisgaard et al. | 177/145 |

*Primary Examiner*—George H. Miller, Jr.
*Attorney, Agent, or Firm*—Heller, Ehrman, White & McAuliffe

[57] ABSTRACT

A weigher-conveyor has a conveyor which is for transporting an object and is supported by a weighing device such that the weight of the object on the conveyor can be measured while it is being transported. A detector is disposed near the downstream end of the conveyor and, when the presence of an object on the conveyor is detected, a control unit determines whether weight signals from the weigher are already stable. If they are stable, the conveyor continues to be driven and a weight value indicated by the stabilized weight signals is outputted. If they are still unstable, the conveyor is stopped until the weight signals stabilize. A weight value indicated by the stabilized weight signals is outputted in this situation.

4 Claims, 3 Drawing Sheets

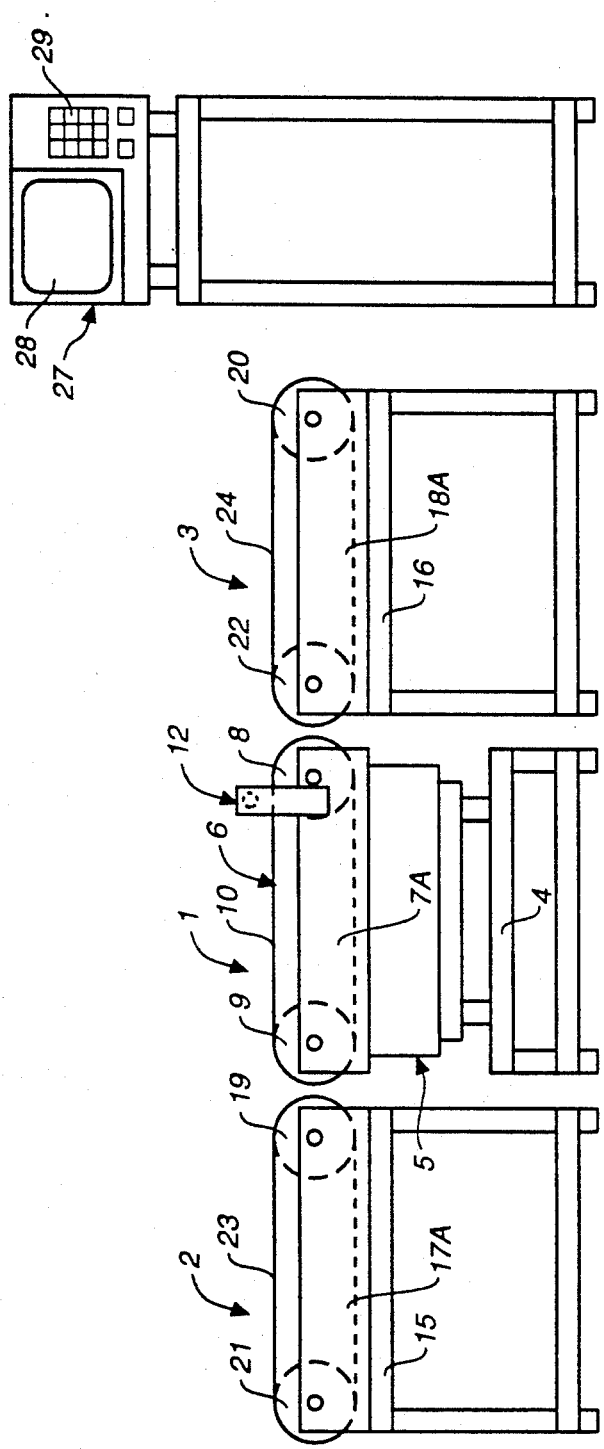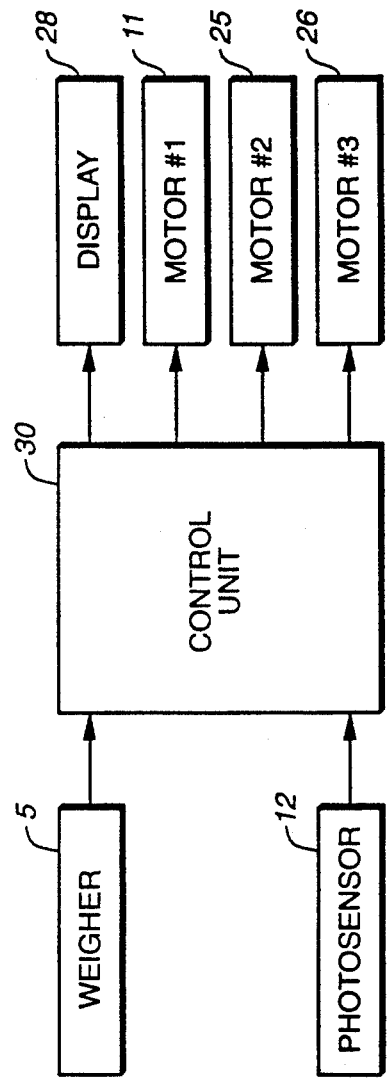

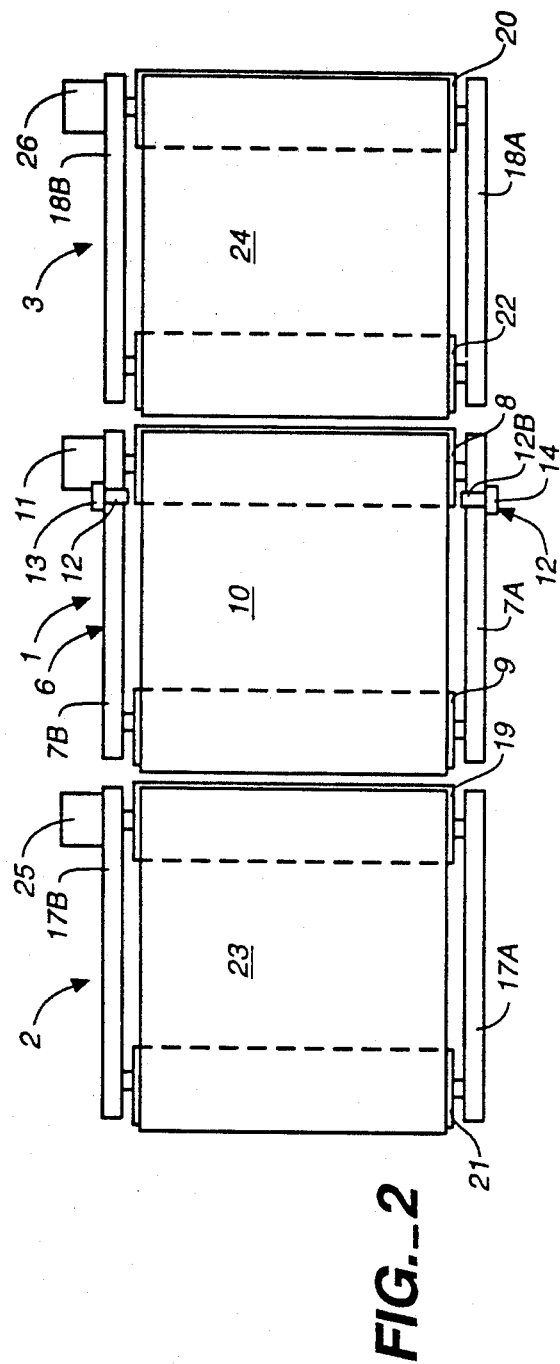
FIG._2
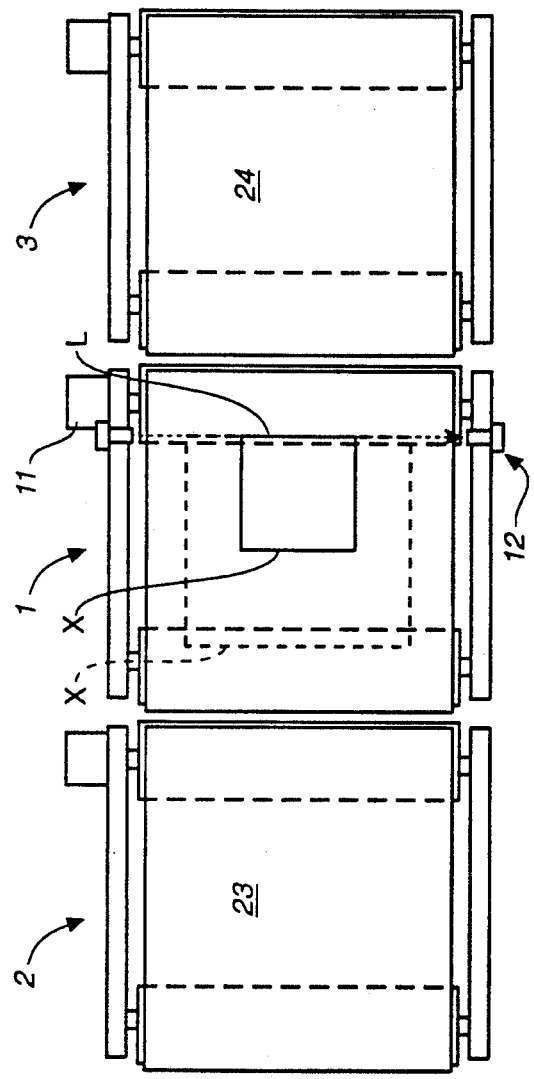
FIG._5

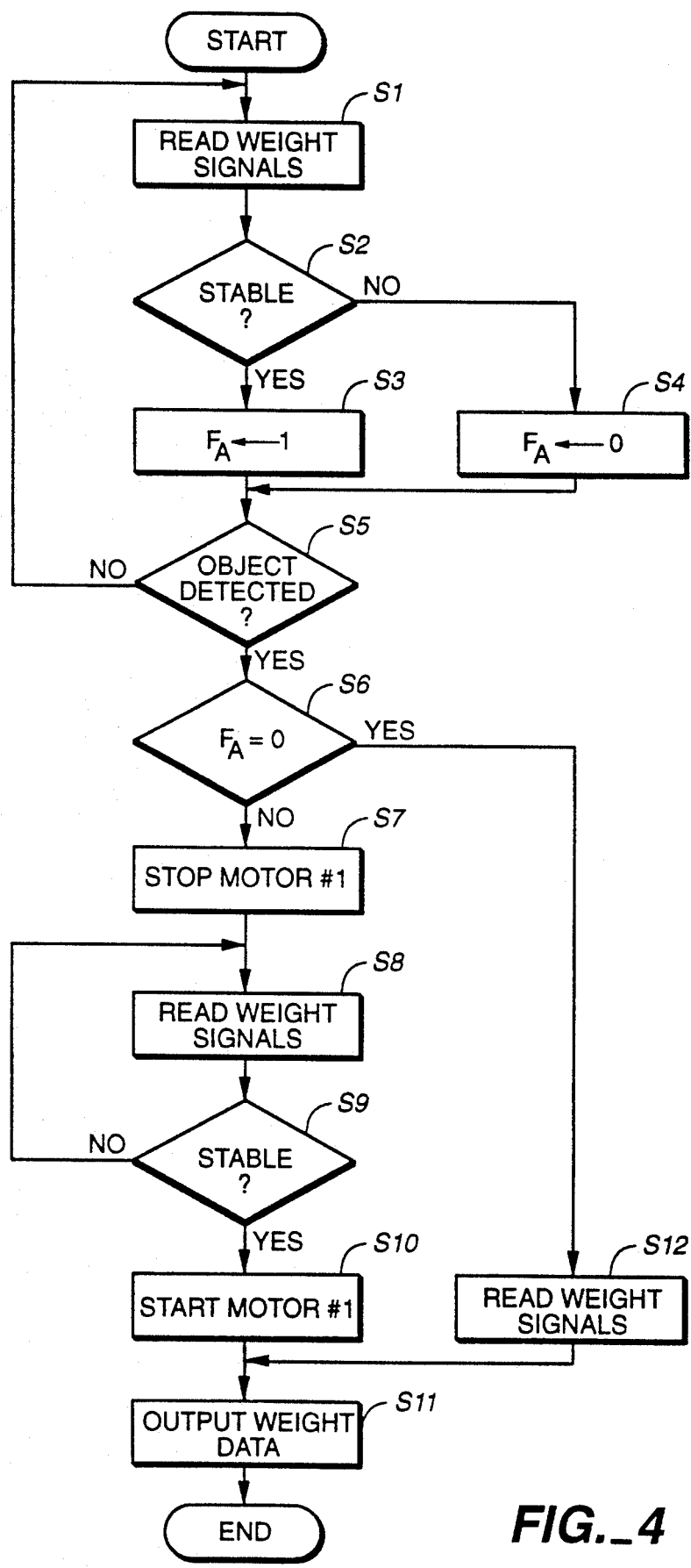
FIG._4

WEIGHER-CONVEYOR SYSTEM

BACKGROUND OF THE INVENTION

This invention relates to a weigher-conveyor system for weighing an object while this object is being transported by a conveyor belt.

It has been known to use a weigher-conveyor system for automatically measuring or checking the weight of an object being transported. Such a weigher-conveyor system is generally comprised of a weighing device supporting a conveyor with a belt stretched between a pair of rollers such that both the weight of an object which is received thereby from a feeder conveyor on its upstream end and the weight of the conveyor itself will be applied to the weighing device. Since the weight of the conveyor is a constant, the weight of the object can be obtained from this total load on the weighing device.

Weighing methods by using a weigher-conveyor system of this kind may be roughly divided into the dynamic weighing whereby the weight of an object is measured while it is being transported and the static weighing whereby the conveyor is momentarily stopped while the object is weighed. Advantages and disadvantages of these two types may be summarized as shown in Table 1.

TABLE 1

|  | Dynamic Weighing | Static Weighing |
| --- | --- | --- |
| Accuracy | Low | High |
| Wheel Balancing | High Precision | Unnecessary |
| Weighing Capability | Fast | Slow |
| Limitation on Size of Target Object | Severe Limitation | OK up to length of conveyor |

Since the dynamic and static weighing methods have mutually opposite functional characteristics, as can be ascertained from Table 1, there have been attempts to make both options available and selectively using one of them, depending on the kind of objects to be weighed. In this situation, however, there arises the new problem of how to choose one or the other of these two methods for target objects having different dimensional and weight characteristics. As a result, the advantages of the individual methods are often not utilized fully, and there remained the problem of not being able to speedily process objects with different dimensions and weights.

SUMMARY OF THE INVENTION

It is therefore an object of the present invention to provide an improved weigher-conveyor system which can automatically select a weighing method which is appropriate in view of the dimensions and weight of the object to be weighed.

A weigher-conveyor system embodying the present invention, with which the above and other objects can be achieved, may be simply characterized as being comprised not only of a conveyor means for transporting an object to be weighed and a weighing means for measuring its weight as it is being transported by the conveyor means, but also of a control means for causing the conveyor means to continuously transport the object if the weight signals from the weighing means are stable at a specified time during the weighing, and stopping the conveyor means momentarily if the weight signals are unstable then. With a weigher-conveyor system thus structured, the conveyor means is driven continuously without stopping if the weight signals are already stabilized at a specified time when the object is still being transported. If the weight signals are still unstable at the specified time, the conveyor means is stopped and the mode of operation is switched from the dynamic weighing mode to the static weighing mode. Thus, relatively short (in the direction of transportation) or light objects are likely to be weighed in the dynamic weighing mode, and relatively long or heavy objects are likely to be weighed in the static weighing mode. This selection of mode of weighing is carried out automatically according to the present invention. Thus, the efficiency of weight measurement can be improved while maintaining the level of accuracy of measurement. Since the mode of operation is automatically switched between the dynamic weighing mode and the static weighing mode, furthermore, weigher-conveyor systems of the present invention have improved versatility and workability.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings:

FIG. 1 is a schematic front view of the whole of a weigher-conveyor system embodying the invention;

FIG. 2 is a schematic plan view of the weighing conveyor and near-by devices;

FIG. 3 is a control system diagram for the weigher-conveyor system of FIG. 1;

FIG. 4 is a flow chart for the control of the weighing conveyor; and

FIG. 5 is a schematic plan view showing the operation of the weigher-conveyor system.

In these figures, like components are indicated by like numerals.

DETAILED DESCRIPTION OF THE INVENTION

As shown in FIGS. 1 and 2, a weigher-conveyor system embodying the present invention is composed of a weighing conveyor 1 for measuring the weight of an object being transported, a feeder conveyor 2 disposed on the upstream side of the weighing conveyor 1, and a discharge conveyor 3 disposed on the downstream side of the weighing conveyor 1. The weighing conveyor 1 is comprised of a weighing device 5 which is set on top of a base 4 and a transporting unit 6 set on top of this weighing device 5. The transporting unit 6 includes a driver roller 8 and a follower roller 9 which are axially supported at both ends of frame members 7a and 7b, a conveyor belt 10 supported by and stretched between the driver roller 8 and the follower roller 9, and a motor 11 (herein referred to as the first motor) for causing the driver roller 8 to rotate.

On the downstream side of the weighing conveyor 1 along the direction of transportation thereby, there is a photosensor 12 for detecting the presence of an object. This photosensor 12 is of a photo-interrupter type and, as better shown in FIG. 2, is comprised of a light-emitting element 12a attached through a stay 13 to one of the frame members (7b) and a light-receiving element 12b attached through another stay 14 to the other of the frame members (7a) such that they are opposite to each other across the conveyor belt 10. The presence of an object is thereby detected according to changes in the amount of light beam L emitted by the light-emitting element 12a and received by the light-receiving element 12b.

The feeder conveyor 2 and the discharge conveyor 3 are structured identically, each having a base 15 or 16, a driver roller 19 or 20 and a follower roller 21 or 22 axially supported at both end parts of frame members 17a or 18a and 17b or 18b, and a conveyor belt 23 or 24 each supported by and stretched between the driver roller 19 or 20 and the follower roller 21 or 22. The driver roller 19 of the feeder conveyor 2 is driven by another motor 25 (herein referred to as the second motor), and the driver roller 20 of the discharge conveyor 3 is driven by still another motor 26 (herein referred to as the third motor).

The weigher-conveyor system is further provided with a console 27 for controlling its operations. The console 27 has on its front surface a display device 28 for displaying data of various kinds and a key input device 29 through which commands of various types and numerical data can be entered.

Next, the control system of this weigher-conveyor system is described with reference to FIG. 3. As shown therein, weight signals from the weighing device 5 of the weighing conveyor 1 and detection signals from the photosensor 12 are received by a control unit 30, and the control unit 30 not only serves to control the motion of the first, second and third motors 11, 25 and 26 for driving the weighing conveyor 1, the feeder conveyor 2 and the discharge conveyor 3 on the basis of these received signals, but also causes a weight value indicated by the weight signals to be displayed on the display device 28.

The flow chart of FIG. 4 shows a program according to which the operation of the weighing conveyor 1 is controlled by the control unit 30. After weight signals from the weighing device 5 are received (S1), the control unit 30 examines whether or not these signals satisfy a stabilization condition (S2). If the stabilization condition is satisfied and hence the weight signals can be considered to have been stabilized (YES in S2), value 1 is substituted to a weight stability flag $F_A$ (S3). If the stabilization condition is not satisfied and hence the weight signals cannot yet be considered to have been stabilized (NO in S2), value 0 is substituted to the weight stability flag $F_A$ (S4). The control unit 30 monitors the output of signals from the photosensor 12 and the loop in the flow chart consisting of Steps S1~S5 is repeated until the control unit 30 receives a detection signal from the photosensor 12, indicating the presence of an object to be weighed (S5). When the presence of an object is thus ascertained (YES in S5), the control unit 30 examines whether the weight stability flag $F_A$ indicates a stable condition or not (S6). If the flag value $F_A$ is found to be other than 1, indicating that the weight signals are still unstable (NO in S6), not only is the first motor 11 stopped (S7), thereby stopping the conveyor belt 10 of the weighing conveyor 1, but this stopped condition is also maintained while the control unit 30 continues to receive weight signals (S8) and until these weight signals reach a stable condition (YES in S9) when the first motor 11 is activated (S10) to restart the motion of the conveyor belt 10. The weight value indicated by the now stabilized weight signals is then caused to be displayed on the display device 28 (S11).

If the control unit 30 finds in Step S6 that the flag value $F_A$ is 1 and hence that the weight signals have already stabilized, weight signals are taken in (S12) and the weight value indicated thereby is caused to be displayed on the display device 28 (S11).

With reference next to FIG. 5, let us consider first a situation where the feeder conveyor 2 has transported onto the weighing conveyor 1 an object X to be weighed which is relatively short longitudinally, or in the direction in which it is being transported. In such a situation, it is likely that the weight signals stabilize by the time the object X comes to the position of the photosensor 12 and crosses its beam L, unless its weight is very large. This corresponds in the flow chart of FIG. 4 to the situation where the flag value $F_A$ is found to be 1 in Step S6 when the presence of an object is detected in Step S5. Thus, the weighing conveyor 1 is not stopped and the object X is transported onto the discharge conveyor 3 immediately.

With reference again to FIG. 5, let us consider next another situation where the feeder conveyor 2 has transported onto the weighing conveyor 1 a relatively longer object X' shown by a broken line. In such a situation, by contrast, the front end of the object X' reaches the position of the photosensor 12 in a much shorter time after the entire weight of the object X' comes to be applied to the weighing device 5. Thus, it is unlikely that the weight signals have stabilized when the presence of the object X' is first detected by the photosensor 12. This corresponds in the flow chart of FIG. 4 to the situation where the flag value $F_A$ is found to be 0 in Step S6 when the presence of an object is detected in Step S5. Thus, the weighing conveyor 1 is momentarily stopped in Step S7 until the weight signals become stable and then is restarted to transport the object X' onto the discharge conveyor 3.

In summary, relatively shorter objects (longitudinally) and relatively light objects will tend to be weighed by a dynamic weighing method, and relatively long objects and relatively heavy objects will tend to be weighed by a static weighing method. According to the present invention, this choice is automatically made.

The present invention has been described above with reference to only one example and by way of only schematic drawings, but this example is not intended to limit the scope of the invention. Many modifications and variations are possible and such modifications and variations that may be apparent to a person skilled in the art are intended to be included within the scope of this invention.

What is claimed is:

1. A weigher-conveyor system comprising:
conveyor means for transporting an object to be weighed;
weighing means for measuring the weight of an object on said conveyor means; and
control means which, if weight signals from said weighing means are stable at a specified time while said conveyor means are in motion, continues to drive said conveyor means and outputs a weight value indicated by said weight signals, and which, if said weight signals from said weighing means from said weighing means are unstable at said specified time, causes said conveyor means to stop and outputs a stable weight value indicated by stabilized weight signals from said weighing means.

2. The weigher-conveyor system of claim 1 further comprising a detector disposed proximal said conveyor means, said detector being adapted to transmit a detection signal to said control means when the presence of an object to be weighed is detected by said detector, said specified time being when said detection signal is received by said control means.

3. The weigher-conveyor system of claim 2 wherein said detector is a photosensor with a light-emitting element and a light-receiving element disposed mutually opposite to each other across said conveyor means near the downstream end of said conveyor means.

4. The weigher-conveyor system of claim 1 further comprising a display device, said control means being adapted to cause said weight value to be displayed on said display device.

* * * * *